United States Patent
Van Ingen et al.

(10) Patent No.: US 6,860,692 B2
(45) Date of Patent: Mar. 1, 2005

(54) NUT CAP AND ASSEMBLY THEREWITH

(75) Inventors: James M. Van Ingen, Algonquin, IL (US); Michael L. Ward, Geneva, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/391,675

(22) Filed: Mar. 19, 2003

(65) Prior Publication Data

US 2003/0202859 A1 Oct. 30, 2003

Related U.S. Application Data

(60) Provisional application No. 60/376,143, filed on Apr. 29, 2002.

(51) Int. Cl.$^7$ .................................................. F16B 37/17
(52) U.S. Cl. ...................................... 411/431; 411/377
(58) Field of Search ................................ 411/429, 431, 411/377, 374, 373, 372.5, 372.6, 910, 911

(56) References Cited

U.S. PATENT DOCUMENTS

| | | | |
|---|---|---|---|
| 1,249,592 A | * 12/1917 | Bruhn ........................ 411/394 |
| 1,397,235 A | * 11/1921 | Sabel ........................ 138/89.4 |
| 2,103,743 A | 12/1937 | Doty |
| 3,136,458 A | * 6/1964 | Ruetz ........................ 222/498 |
| 3,372,834 A | * 3/1968 | Ayotte et al. ................ 220/780 |
| 3,904,063 A | 9/1975 | Hauser |
| 4,382,635 A | 5/1983 | Brown et al. ........... 301/37 TP |
| 4,582,462 A | 4/1986 | Thiel |
| 4,659,273 A | 4/1987 | Dudley ........................ 411/373 |
| 4,786,224 A | 11/1988 | Wharton ........................ 411/1 |
| 4,962,968 A | 10/1990 | Caplin .................. 301/108 SC |
| 4,968,202 A | 11/1990 | Lanham ........................ 411/431 |
| 5,048,898 A | 9/1991 | Russell ..................... 301/37 S |
| RE33,806 E | 1/1992 | Wang et al. ............... 301/37 S |
| 5,082,409 A | 1/1992 | Bias ............................ 411/431 |
| 5,098,242 A | * 3/1992 | Schaty ........................ 411/437 |
| 5,163,797 A | 11/1992 | Patti ............................ 411/431 |
| 5,340,201 A | 8/1994 | Weirs ....................... 301/37.26 |
| D350,524 S | 9/1994 | Bias ........................... D12/213 |
| 5,350,266 A | 9/1994 | Espey et al. ................ 411/431 |
| 5,380,070 A | 1/1995 | Fitzgerald ................ 301/37.37 |
| 5,752,794 A | * 5/1998 | Krawczak .................... 411/374 |
| 5,810,532 A | 9/1998 | Huang ......................... 411/431 |
| 5,857,818 A | 1/1999 | Bias, Sr. ..................... 411/431 |
| 6,036,420 A | 3/2000 | Somers et al. .............. 411/430 |
| 6,135,570 A | 10/2000 | Wieczorek ................ 301/37.37 |
| 6,238,158 B1 | 5/2001 | Clements .................... 411/431 |
| 6,273,658 B1 | 8/2001 | Patterson et al. ........... 411/431 |
| 6,318,942 B1 | * 11/2001 | Wieczorek .................. 411/431 |
| 6,398,471 B1 | * 6/2002 | Fischer .......................... 411/8 |

\* cited by examiner

*Primary Examiner*—Flemming Saether
(74) *Attorney, Agent, or Firm*—Mark W. Croll; Paul F. Brown

(57) ABSTRACT

A nut cap and assembly therewith is provided. The capped nut assembly is made up of a nut body and a cap. The nut body has an elongated internally threaded member formed with polygonal side walls extending from a collar member at the inner end toward the outer end, and the cap has a hollow shell with an end wall closing one end and being open at an opposite end. The cap is sleeved over said nut body with its side wall surrounding the polygonal side walls and its closed end overlies the outer end of the nut body, and the open end of the cap has a radially inwardly flared resilient lip portion that attaches to the collar member in a snap fitting relationship. The outer end of the nut body has an engagement member protruding therefrom, and the inside surface of the hollow shell has a ramping member at a location that it is adapted to strike the engagement member whenever the cap is rotated about the nut body such that the ramping member biases the resilient lip portion in a direction to release its holding force on the collar portion.

20 Claims, 1 Drawing Sheet

NUT CAP AND ASSEMBLY THEREWITH

CROSS-REFERENCE TO RELATED APPLICATIONS

This Non-Provisional Application claims the benefit of U.S. Provisional Application Ser. No. 60/376,143, filed on Apr. 29, 2002.

FIELD OF THE INVENTION

This invention relates to capped nut assemblies, and more particularly, to capped wheel nut assemblies for automotive products.

BACKGROUND AND SUMMARY OF THE INVENTION

Lug nut covers are commonly used to protect the threads of the stud or lug bolt from damage, dirt and rust. However, one problem with these known covers is that it can be difficult to secure them to the vehicle lug nut and they are often misplaced or lost. A number of patented caps have been developed to address this problem, such as found in U.S. Pat. Nos. 5,350,266 and 5,163,797, but these prior art patented caps have a two part assembly which is expensive to manufacture and which can be cumbersome to use. Thus, there is a need for a new capped wheel nut assembly that addresses these problem and other problems associated with known designs.

A feature of the present invention is to provide a lug nut cover or cap which has only one part, which is inexpensive to manufacture and easy to use, and yet which also provides a very secure holding force on the vehicle lug nut.

Another feature of the present invention is to provide a capped wheel nut assembly which adds a simple modification to a standard wheel nut that cooperates with a feature on a snap-fitting lug nut cap to allow for a quick release of the cap from the nut.

Another feature of the present invention is to provide a lug nut cover which has a very secure holding force when assembled to an associated lug nut, but which is also easy to remove from the lug nut when removal is desired.

A further feature of this invention is to provide a capped wheel nut assembly which is rugged and durable in use and is capable of being inexpensively manufactured and assembled, and which can be quickly installed and removed from the wheel nut.

Other features and advantages of the invention will become apparent to those skilled in the art upon review of the following detailed description, claims and drawings in which like numerals are used to designate like features.

Figure 1:
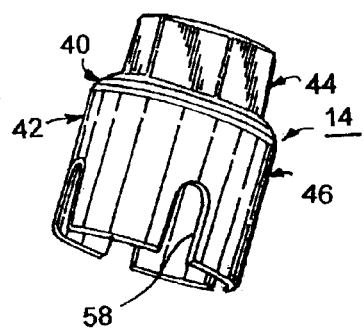
FIG. 1 is a perspective view of a lug nut cap according to the present invention.
Figure 2:
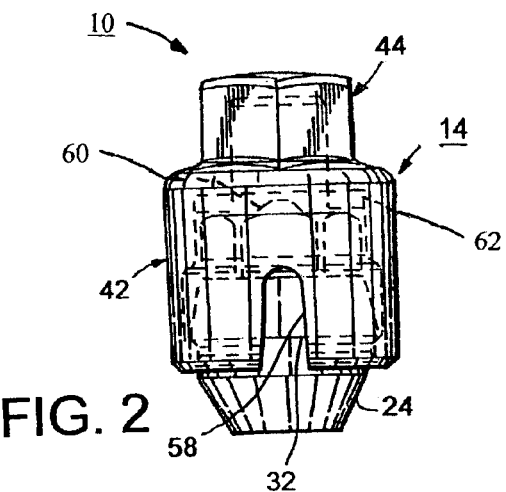
FIG. 2 illustrates a capped wheel nut assembly constructed and arranged according to the present invention.
Figure 3:
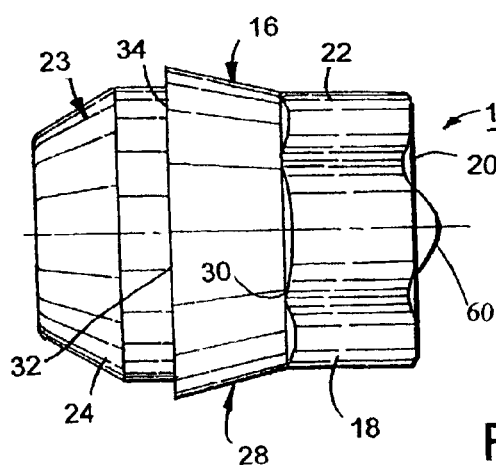
FIG. 3 illustrates the wheel nut shown in FIG. 2.
Figure 4:
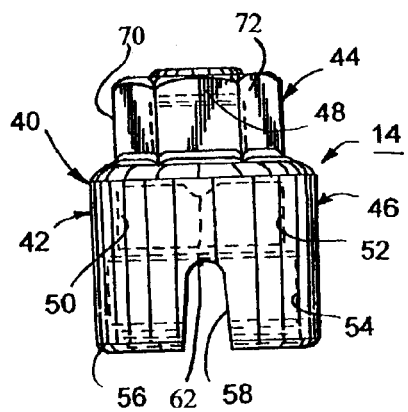
FIG. 4 further illustrates the wheel nut cap shown in FIGS. 1 and 2.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting.

DETAILED DESCRIPTION OF THE PREFERRED EMBODIMENTS

Referring to the figures, there is shown a capped wheel nut assembly 10 comprising a lug or wheel nut 12 and a cap 14 according to one embodiment of the present invention.

The wheel nut 12 is constructed in the form of an elongated tubular like body 16. The body 16 has a main body portion 18 extending from an end 20. The main body portion 18 has a polygonal side wall in the form of a six-sided regular polyhedron in which all six outer surfaces or flats 22 are identical and in which the angles between adjacent flats are all equal. The flats 22 extend parallel to the longitudinal center line of the tubular body 16. The tubular nut body 16 is tapered at the outer end 23 to provide a frusto-conical seat 24 adapted to engage a complementary mating surface. The nut body 16 is preferably interiorly threaded through the center of the nut body 16 as is commonly known. The nut body 16 has a collar member 28 between the main body portion 18 and the frusto-conical seat 24. The collar member 28 includes a stepped portion or shoulder 34 which, as will be further explained below, cooperates with a mating member of the wheel nut cap 14 in the capped wheel nut assembly 10. As shown, in a preferred embodiment, the collar member 28 flares out from the end 30 of main body portion 18 to a juncture 32 with the outer end 23 to further define the stepped or shoulder portion 34.

The cap 14 is constructed in the form of hollow shell 40 and in the shape of an elongated tubular like body 42 having an upper body portion 44 and a lower body portion 46. The upper body portion 44 has a generally cylindrical upper cavity portion 48, which is concentric with a generally cylindrical lower cavity portion 50. The upper cavity portion 44 is adapted to house the end of a threaded lug (not shown) that may, in some cases, extend above and through the wheel nut 12 when the wheel nut is installed on an automotive threaded lug. The lower cavity portion 50 is constructed and arranged to fit over a substantial portion of the wheel nut 12. The lower cavity portion 50 includes an upper cylindrical section 52 that is adapted to fit over the main body portion 18. The lower cavity portion 50 further includes a lower cavity section 54 that has a slightly larger diameter than upper cylindrical section 52. The lower cavity section 54 terminates in a radially-inwardly flared lip portion 56. The length of the lower cavity portion 50 is selected to enable the lip 56 to snap over the annular shoulder 34 on the inner end of collar member 28 when the cap 14 is pressed onto the wheel nut 12. To better allow the lip 56 to be snap-fitted to the shoulder 34, the lower cavity section 54 includes four equally spaced relief slots 58 formed through and inwardly of the lip 56. The length of the slots 58 is preferably the length of the lower cavity section 54, which length is generally equal to the length of the collar member 28. Although the cap 14 can be made from any number of suitable materials, by virtue of making the cap 14 from a flexible, yet sturdy, plastic material and by adding the relief slots 58, the cap 14 can be constructed and arranged with a large holding force when the lip portion 56 snaps onto the shoulder portion 34 of the collar member 28. Preferably, the holding force is generally too large to allow one to easily and readily twist the cap 14 off the wheel nut 12.

Even so, one of the features of the present invention is to provide a quick and easy means of releasing the grip of lip portion 56 from the collar 28. One method of providing this feature is to add an engagement means to the wheel nut 12, such as a pair of diametrically opposite protrusions or cap ramps 60 on the outer end 20 of the main body portion 18, and an associated engagement means to the cap 14, such as a pair of diametrically opposite protrusions or nut ramps 62 in the inner portion of the upper section 52 of the lower cavity portion 50. The engagement means 60 is added to the outer end 20 of the main body portion 18 at a position to be in the path of travel of the engagement means 62 inside the cap 14, when the cap 14 is caused to rotate about the nut 12. The engagement of the ramping members 60 and 62 will force the lip portion 56 of the cap 14 to move off of the shoulder portion 34 of collar member 28. The resilient nature of the lip 56 allows the lip 56, and to some extent a portion of the lower cavity portion 50, to expand and move over the shoulder 34 when the cap 14 is caused to move off of the nut 12. As can be appreciated, the engagement ramps 60 will engage the engagement ramps 62 as the cap 14 is twisted about the nut 12 in either direction, and that upon this engagement the ramps will push the cap 14 from the nut 12 in an upward axial direction. When this axial force is greater than the holding force of the resilient lip portion 56, the lip portion 56 is pulled off of the collar member 28. To facilitate the twisting of cap 14, the upper body portion 44 of hollow shell 40 is formed with a polygonal outer side wall 70 in the form of a six-sided regular polyhedron in which all six outer surfaces or flats 72 are identical and in which the angles between adjacent surfaces or flats 72 are equal. The flats 72 extend parallel to the longitudinal center line of the hollow shell 40. To remove the cap 14 from the wheel nut 12, a conventional wrench can be applied over the flats 72 and turned in either direction until the ramping member 62 strikes and moves over the engagement means 60 on the wheel nut 12. This action causes the cap 14 to be cammed off of the wheel nut 12. Although cap 14 is shown and described as having a standard hex shape, the cap 14 can include any number of suitable configurations, such as, for example, a slotted head, to assist in the removal of the cap 14 from the nut 12.

Although the engagement means 60 and 62 are shown and described as being ramping means, the engagement means 60 and 62 can be constructed and arranged in any number of different ways in accordance with the principles of the present invention. For example, the engagement means can be in the form of single protrusions on the wheel nut and associated cap, or the engagement means could be replaced by any number of well known cam and cam follower devices that would function to push the cap in a generally upward axial direction relative to the wheel nut when it is desirable to remove the cap from the wheel nut. It should also be noted that although the wheel nut 12 and cap 14 have been shown and described to include a particular snap-fit combination, the nut and cap can be constructed and arranged to include other snap-fit assemblies in accordance with the principles of the present invention. In addition, it should be understood that although the invention has been primarily described for use with a vehicular wheel nut assembly, the invention is capable of use in any number of other suitable applications, and the use of an automotive wheel nut assembly is merely intended to provide an example of one such application.

Lastly, it should also be understood that the invention is not limited in its application to the details of construction and arrangements of the components set forth herein. The invention is capable of other embodiments and of being practiced or carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiment described herein explains the best mode known for practicing the invention and will enable others skilled in the art to utilize the invention.

Various features of the invention are set forth in the following claims. The claims are to be construed to include alternative embodiments to the extent permitted by the prior art.

What is claimed is:

1. A cap for a nut, the cap comprising:
   a hollow shell portion with an open end for fitting over the nut;
   an inner cavity adapted to fit over and receive a portion of the nut;
   an inwardly extending lip located near the open end of the hollow shell, the lip being constructed and arranged to allow the cap to expand and be snap-fitted over the nut; and
   an engagement member being constructed and arranged such that when the cap is caused to rotate with respect to the nut after the cap has been placed on the nut, the engagement member will engage a portion of the nut such that upon continued rotation of the cap, the lip, being constructed and arranged to allow the cap to expand, allows the cap to expand in such a manner that the cap lifts off of the nut so as to allow the removal of the cap from the nut.

2. A cap as set forth in claim 1, wherein the cap includes a force receiving portion for receiving a force applying member for assisting in the rotation of the cap.

3. A cap as set forth in claim 1, wherein the cap includes at least one relief slot which extends through the lip to further enhance a resilient feature of the cap.

4. A nut cap assembly comprising:
   a nut having a body which includes a first body portion extending from an outer end and a spaced apart second body portion adapted to engage a complementary mating surface, a collar member defining a shoulder positioned between the outer end and the second body portion, and a first engagement member; and
   a cap having a hollow shell portion with an open end for fitting over the nut, a lip adapted to snap-over the shoulder of the nut when the cap is pushed onto the nut so as to securely attach the cap to the nut, and a second engagement member, wherein the engagement members are constructed and arranged such that when the cap is caused to rotate about the nut after the cap has been placed on the nut, the engagement members will engage one another in such a manner to force the cap off of the nut in an upward axial direction so as to allow the removal of the cap from the nut.

5. An assembly as set forth in claim 4, wherein the first body portion of the nut includes a force receiving portion for receiving a force applying member for turning the nut, and wherein the second body portion includes a frusto-conical seating surface for engagement with the complementary mating surface.

6. An assembly as set forth in claim 5, wherein the collar member flares outwardly from an end of the first body portion to further define the shoulder.

7. An assembly as set forth in claim 4, wherein the first engagement member includes a pair of diametrically opposite cap ramps extending outwardly from the outer end.

8. An assembly as set forth in claim 4, wherein the cap includes an upper body portion and a lower body portion, the lower body portion being constructed and arranged to fit over a substantial portion of the nut.

9. An assembly as set forth in claim 8, wherein the lower body portion of the cap includes an upper cavity section and a lower cavity section, the upper cavity section being adapted to house the first body portion of the nut, and the lower cavity section being adapted to house the collar member of the nut.

10. An assembly as set forth in claim 9, wherein the lower cavity section of the lower body portion of the cap terminates at the lip.

11. An assembly as set forth in claim 10, wherein the lip is a radially-inwardly protruding, flared lip.

12. An assembly as set forth in claim 4, wherein the cap includes at least one relief slot in the hollow shell portion so as to enhance a relief feature of the cap.

13. An assembly as set forth in claim 4, wherein the cap includes a force receiving portion for receiving a force applying member for assisting in the rotation of the cap.

14. An assembly as set forth in claim 4, wherein the second engagement member includes a pair of diametrically opposite nut ramps formed within the hollow shell portion.

15. A capped wheel nut assembly comprising:

a nut having an elongated tubular like body, the body having a main body portion extending from a first end and a frusto-conical portion extending in an opposite direction from a second end, the frusto-conical portion being adapted to seat against a complementary mating surface, the body further having a collar member that is located between the main body portion and the frusto-conical portion, the collar member being constructed and arranged to flare outwardly from an end of the main body portion towards the frusto-conical portion to define a shoulder extending about the body, the nut further including an engagement means extending outwardly from the first end of the nut; and a cap having an elongated tubular like body and a hollow shell portion with an open end adapted for fitting over the nut, the body having an upper body portion and a lower body portion, the lower body portion includes an upper generally cylindrical cavity section and a lower generally cylindrical cavity section that has a slightly larger diameter than the upper cavity section, the upper cavity section being sized to receive and fit over the main body portion of the nut and the lower cavity section being sized to receive and fit over the collar member of the nut, the lower cavity section terminating in a radially-inwardly extending lip near the open end of the hollow shell, the lip being adapted to snap-over the shoulder of the nut when the cap is pushed onto the nut so as to securely attach the cap to the nut, the cap further having an engagement means formed inside the hollow shell member and within the upper cavity section of the lower body portion, such that the engagement means of the nut and the engagement means of the cap are constructed and arranged in such a manner that when the cap is rotated with respect to the nut after the cap has been snap-fitted onto the nut, the respective engagement means engage one another so that the lip moves up and over the shoulder to allow for the removal of the cap from the nut.

16. A capped wheel nut assembly as set forth in claim 15, wherein the first body portion of the nut includes a force receiving portion for receiving a force applying member for turning the nut, and wherein the upper body portion of the cap includes a force receiving portion for receiving a force applying member for tuning the cap.

17. A capped wheel nut assembly as set forth in claim 15, wherein the lip of the cap has a flared shape.

18. A capped wheel nut assembly as set forth in claim 15, wherein the lower body portion of the cap includes at least one relief slot which extends through the lip to further enhance a resilient feature of the cap.

19. A capped wheel nut assembly as set forth in claim 15, wherein the engagement means of the nut includes a pair of diametrically opposite cap engaging ramps, and wherein the engagement means of the cap includes a pair of diametrically opposite nut engaging ramps.

20. A capped wheel nut assembly as set forth in claim 15, wherein the upper body portion of the cap includes a cavity that is adapted to receive a threaded lug extending beyond the first end of the nut.

* * * * *

UNITED STATES PATENT AND TRADEMARK OFFICE
CERTIFICATE OF CORRECTION

PATENT NO.    : 6,860,692 B2
DATED         : March 1, 2005
INVENTOR(S)   : James M. Van Ingen et al.

It is certified that error appears in the above-identified patent and that said Letters Patent is hereby corrected as shown below:

Title page,
Item [75], Inventors, correct the spelling of inventor "Michael L. Ward" to
-- Michael E. Ward --.
Item [74], *Attorney, Agent, or Firm*, change the name of attorney "Paul F. Brown" to
-- Paul F. Donovan --.

Signed and Sealed this

Seventh Day of June, 2005

JON W. DUDAS
*Director of the United States Patent and Trademark Office*